(12) United States Patent
Nobutani et al.

(10) Patent No.: US 10,489,097 B2
(45) Date of Patent: Nov. 26, 2019

(54) IMAGE PROCESSING DEVICE AND NON-TRANSITORY COMPUTER READABLE MEDIUM

(71) Applicant: FUJI XEROX CO., LTD., Tokyo (JP)

(72) Inventors: Naoya Nobutani, Kanagawa (JP); Masafumi Ono, Kanagawa (JP); Manabu Hayashi, Kanagawa (JP); Kunitoshi Yamamoto, Kanagawa (JP); Toru Suzuki, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/657,221

(22) Filed: Jul. 24, 2017

(65) Prior Publication Data

US 2018/0157449 A1 Jun. 7, 2018

(30) Foreign Application Priority Data

Dec. 7, 2016 (JP) .................. 2016-237923

(51) Int. Cl.
| | |
|---|---|
| *G06F 3/12* | (2006.01) |
| *G06F 21/32* | (2013.01) |
| *G06F 9/00* | (2006.01) |
| *G06K 9/00* | (2006.01) |
| *H04N 1/00* | (2006.01) |
| *G06F 21/60* | (2013.01) |
| *H04N 5/217* | (2011.01) |
| *H04N 5/232* | (2006.01) |

(52) U.S. Cl.
CPC .......... *G06F 3/1286* (2013.01); *G06F 3/1222* (2013.01); *G06F 3/1238* (2013.01); *G06F 3/1285* (2013.01); *G06F 21/32* (2013.01); *G06F 21/608* (2013.01); *G06K 9/0002* (2013.01); *G06K 9/00288* (2013.01); *H04N 1/0035* (2013.01); *H04N 5/217* (2013.01); *H04N 5/23229* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 8,446,609 B2 | 5/2013 | Moriwaki | |
| 9,065,955 B2 | 6/2015 | Baba | |
| 2009/0290190 A1* | 11/2009 | Torii | ................. G06F 3/1222 358/1.15 |

(Continued)

FOREIGN PATENT DOCUMENTS

| | | |
|---|---|---|
| JP | 2010-199838 | 9/2010 |
| JP | 5482956 | 5/2014 |

*Primary Examiner* — Helen Zong
(74) *Attorney, Agent, or Firm* — JCIPRNET

(57) ABSTRACT

An image processing device includes a reception unit that receives an image forming instruction from a user, a reservation unit that reserves the image forming instruction in association with the user, an acceptance unit that accepts a user's log-in operation, an authentication unit that authenticates the user, and an image forming unit that executes the image forming instruction, which is reserved in the reservation unit and is associated with the authenticated user, without accepting the log-in operation by the acceptance unit in a case where the authentication by the authentication unit has been completed.

18 Claims, 10 Drawing Sheets

(56) References Cited

U.S. PATENT DOCUMENTS

| | | | |
|---|---|---|---|
| 2010/0169343 A1* | 7/2010 | Kenedy | G06F 17/30867 707/758 |
| 2017/0371601 A1* | 12/2017 | Kaneko | G06F 3/1204 |
| 2018/0075032 A1* | 3/2018 | Kimura | G06F 17/30029 |
| 2018/0077317 A1* | 3/2018 | Kano | H04N 1/4413 |
| 2018/0101341 A1* | 4/2018 | Tsuchiya | G06F 3/1234 |

* cited by examiner (a)

(b)

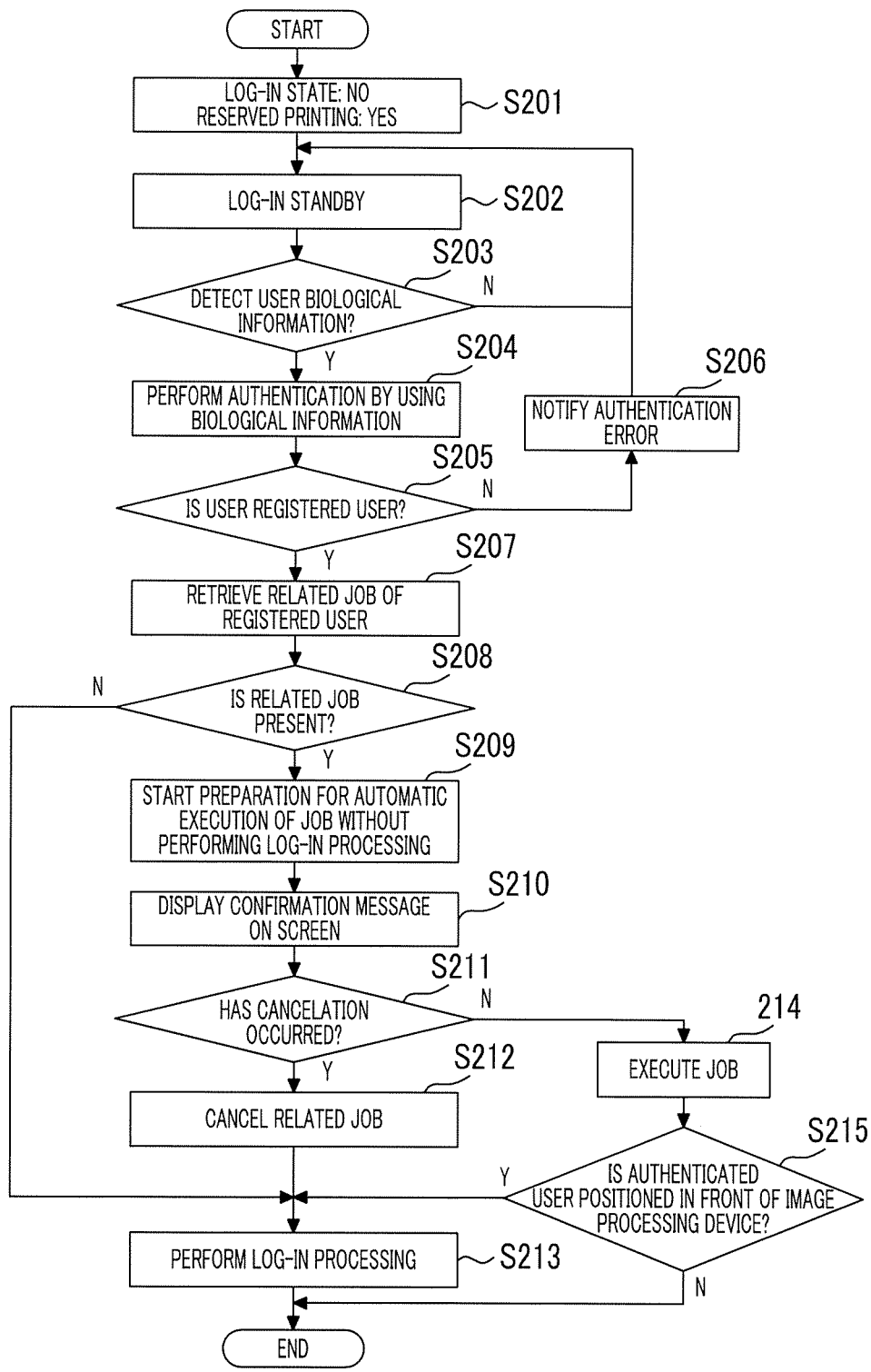

IMAGE PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-237923 filed on Dec. 7, 2016.

BACKGROUND

(i) Technical Field

The present invention relates to an image processing device and a non-transitory computer readable medium.

(ii) Related Art

A system has been proposed which first reserves a printing instruction in an image processing device without immediately performing printing in the image processing device in a case where a user outputs the printing instruction to an image processing device multi-function printer from a terminal through a network, and performs the printing instruction by using the user's instruction in the image processing device as a trigger. By such a system, it is possible to prevent a situation, such as printed matter being viewed or being taken by a third party other than the user, which may occur in a case where the printing instruction is executed at the time of reception of the printing instruction.

SUMMARY

A configuration in which an image forming instruction such as a printing instruction is first reserved in an image processing device and the image forming instruction is executed using a user's instruction in the image processing device as a trigger is effective from the viewpoint of improving security. On the other hand, the user's operation, such as the operation of a UI touch panel in the image processing device, is further required. In a configuration in which a user logs in by the operation of a UI touch panel, or the like, the user's log-out operation is also required after a job such as image formation is completed.

According to an aspect of the invention, there is provided an image processing device including a reception unit that receives an image forming instruction from a user, a reservation unit that reserves the image forming instruction in association with the user, an acceptance unit that accepts a user's log-in operation, an authentication unit that authenticates the user, and an image forming unit that performs the image forming instruction, which is reserved in the reservation unit and is associated with the authenticated user, without accepting the log-in operation by the acceptance unit in a case where the authentication by the authentication unit has been completed.

BRIEF DESCRIPTION OF THE DRAWINGS

Exemplary embodiment(s) of the present invention will be described in detail based on the following figures, wherein:

FIG. 10 is a flow chart illustrating a process of the second exemplary embodiment.

DETAILED DESCRIPTION

Figure 1:
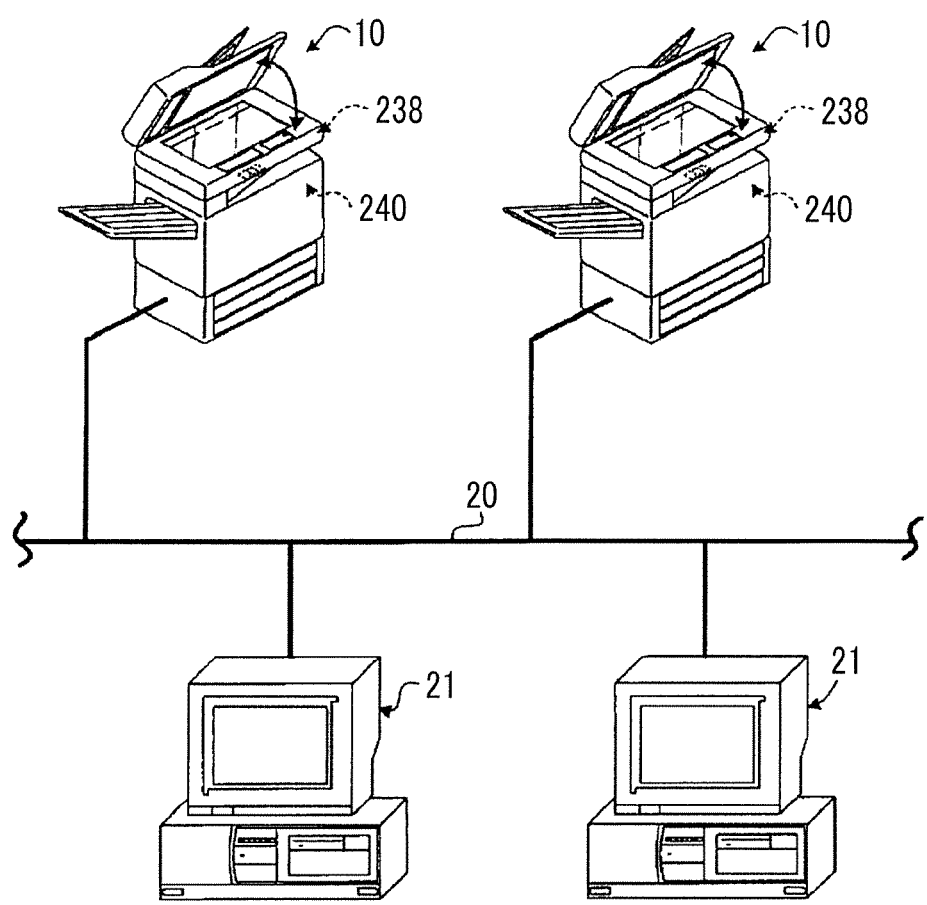
FIG. 1 is a configuration diagram illustrating a system of an exemplary embodiment.

Hereinafter, exemplary embodiments of the present invention will be described with reference to the accompanying drawings.

First Exemplary Embodiment

First, a basic principle of this exemplary embodiment will be described.

As described above, a configuration in which an image forming instruction such as a printing instruction is first reserved in an image processing device and the image forming instruction is executed using a user's instruction in the image processing device as a trigger is effective from the viewpoint of improving security. On the other hand, the user's operation, such as the operation of a UI touch panel in the image processing device, is further required. In a case where the image processing device is operated, the user's log-in operation is usually required. As a result, the user goes through (A) an operation step of an image forming instruction for the image processing device→authentication for the image processing device→an execution instruction using the UI touch panel of the image processing device, at the time of image formation.

Consequently, in this exemplary embodiment, an image forming process is automatically performed by using the completion of authentication as a trigger focusing on the authentication for the image processing device, and thus a reduction in the user's operation step is achieved by making the subsequent log-in operation using the UI touch panel unnecessary.

In this exemplary embodiment, the user can perform image formation by going through (B) an operation step of an image forming instruction for the image processing device authentication for the image processing device, at the time of image formation.

Various authentication methods such as authentication using an IC card, biological authentication using a facial image, a fingerprint, or a vein, and authentication using a portable terminal can be adopted for the authentication in this exemplary embodiment, but authentication other than authentication using a UI touch panel is suitable. Authentication can be roughly classified into authentication (vicinity authentication) in the vicinity of the image processing device and authentication (remote authentication) at a position relatively separated from the image processing device.

The vicinity authentication is, for example, authentication performed by holding up an IC card, authentication using a fingerprint or a vein, authentication performed by bringing a face close to a predetermined position and imaging the face by a camera, or the like. The remote authentication is, for example, authentication performed by imaging at a long distance by using a camera.

In this exemplary embodiment, it can be said that when a user can be authenticated and a reserved image forming process associated with the user is present, the reserved image forming process is automatically performed without requiring the user's log-in operation. Since the user does not need to perform a log-in operation, a log-out operation after the completion of the image forming process is not also required as the counter effect. This means that even when an image forming device of the user is executed, the image processing device is not in the user's log-in state and is not in the user's occupancy state. Therefore, in this exemplary embodiment, even during an image forming process of an authenticated user, a log-in operation of another user other than the user is permitted, and another user's operation start waiting time is canceled.

Meanwhile, in this exemplary embodiment, "authentication" means a process of acquiring information (including biological information) regarding a user and confirming whether or not the information conforms to user information registered in advance. This authentication does not include the user's operation of an operation panel other than the UI touch panel. In addition, "log-in" means a process of making the user have access to the image processing device by operating an operation panel other than the UI touch panel to enable the operation. The image processing device creates a session specific to the user on the image processing device in association with a log-in process, and the system of the image processing device limits the user's available operation by the session in the user's log-in state. In this exemplary embodiment, the use of the image processing device is not basically started at the point in time when the user is authenticated, and the use of the image processing device is started only after the user logs in.

Hereinafter, this exemplary embodiment will be described in detail by taking the printing of document data or the like as an example of image formation.

FIG. 1 is a configuration diagram illustrating a system of an exemplary embodiment. An image processing device 10 is connected to a network 20 such as the Internet. The number of image processing devices 10 is arbitrary. In addition, a personal computer (PC) 21 as a terminal is also connected to the network 20. A user outputs an image forming (printing) instruction to the image processing device 10 from the PC 21 in a remote manner. Naturally, aside from this, the user standing in front of the image processing device 10 can also output the printing instruction by various operations. This exemplary embodiment is characterized by processing in a case where the user outputs a printing instruction from the PC 21 through the network 20, and this processing will be mainly described below.

Meanwhile, the PC 21 is just an example of a terminal, and may be a smart phone or a tablet terminal. In addition, the network 20 may be a wired or wireless network.

The image processing device 10 includes an image forming unit 240 that forms an image on a recording sheet, and an image reading unit 238 that reads a copy image, and may further include a facsimile communication control circuit. The image processing device 10 includes a main controller 200, and controls the image forming unit 240, the image reading unit 238, and the facsimile communication control circuit to temporarily store image data of the copy image read by the image reading unit 238 and transmit the read image data to the image forming unit 240 or the facsimile communication control circuit.

The network 20 such as the Internet is connected to the main controller 200, and a telephone line network is connected to the facsimile communication control circuit. The main controller 200, which is connected to the PC 21 through, for example, the network 20, receives image data and performs facsimile reception and facsimile transmission by using a telephone line network through the facsimile communication control circuit.

The image reading unit 238 is provided with a copy holder for positioning a copy, a scanning driving system that scans and irradiates an image of the copy placed on the copy holder with light, and a photoelectric conversion element, such as a CCD, which receives light reflected or transmitted by the scanning of the scanning driving system to convert the light into an electrical signal.

The image forming unit 240 includes a photoreceptor. A charging device that uniformly charges the photoreceptor, a scanning exposing unit that performs scanning with a light beam on the basis of image data, an image developing unit that develops an electrostatic latent image formed by the scanning and exposing of the scanning exposing unit, a transfer unit that transfers an image on the developed photoreceptor to a recording sheet, and a cleaning unit that cleans the surface of the transferred photoreceptor are provided in the vicinity of the photoreceptor. In addition, a fixing unit that fixes the image on the transferred recording sheet is provided on a transport path of the recording sheet.

Figure 2:
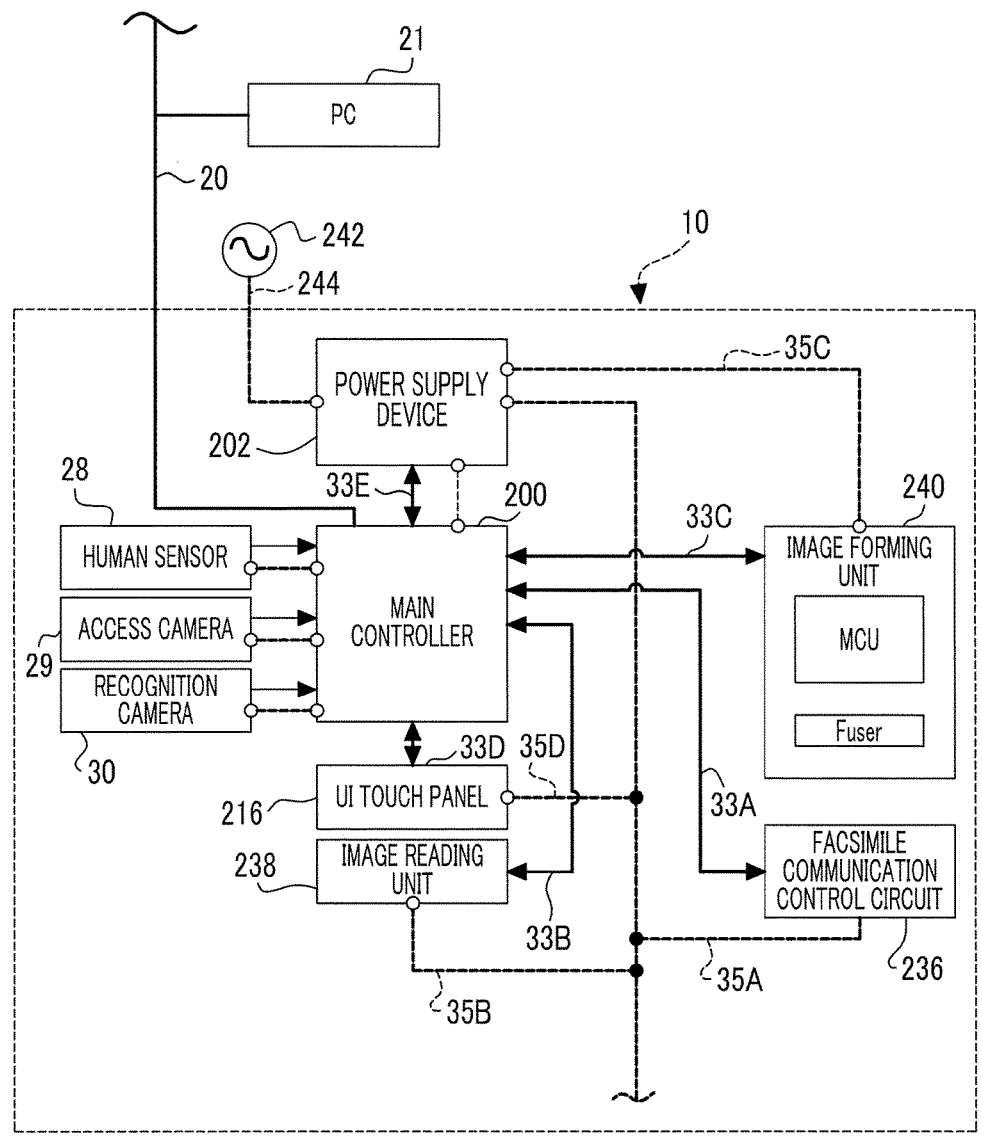
FIG. 2 is a block diagram illustrating a configuration of an image processing device of the exemplary embodiment.

FIG. 2 is a block diagram illustrating a configuration of the image processing device 10. The network 20 is connected to the main controller 200. A facsimile communication control circuit 236, an image reading unit 238, an image forming unit 240, and a UI touch panel 216 are connected to the main controller 200 respectively through buses 33A to 33D such as a data bus or a control bus. The processing units of the image processing device 10, including the main controller 200 as a main body, are controlled.

In addition, the image processing device 10 includes a power supply device 202, and the power supply device 202 is connected to the main controller 200 by a harness 33E. The power supply device 202 receives the supply of power from the commercial power supply 242. The power supply device 202 is provided with power supply lines 35A to 35D that supply power to the main controller 200 and independently supply power to the facsimile communication control circuit 236, the image reading unit 238, the image forming unit 240, and the UI touch panel 216 which are the other devices. For this reason, in the main controller 200, the supply of power or the interruption of power supply are individually performed on each processing unit (device).

Plural sensors (a human sensor 28, an access camera 29, and a recognition camera 30) are connected to the main controller 200, and monitor the presence or absence of a person in the vicinity of the image processing device 10, and the like.

The human sensor 28 detects the movement of a moving body such as a user in the vicinity of the image processing device 10. As the human sensor 28, for example, an infrared sensor using a pyroelectric effect of a pyroelectric element can be used. The sensor using a pyroelectric effect of a pyroelectric element is characterized in that power consumption is lower than that of a reflective sensor including a light projection unit and a light receiving unit and a detection region is wide. When a person is stopped in the detection region in order to detect the movement of a moving body, the presence of the person is not detected. When the movement of the moving body is detected by the human sensor 28, power is supplied to each unit of the image processing device 10, and transition from a sleep state to an operation state is made.

The access camera 29 detects movement information (including distance information and moving direction information) of a moving body such as a user. The access camera 29 captures an image in which at least the transition of positional coordinates of the moving body is recognized. When a transmission signal is received from the moving body side in a case of position capturing of the moving body, radar can also be applied. As the access camera 29, an image sensor (a CCD image sensor or a CMOS image sensor) can be applied. As specifications of the access camera 29, the access camera may have such a resolution as to confirm a trajectory becoming close to the image processing device 10 and may have a visual field (imaging region) which is wider (particularly, a wide angle) than that of the human sensor 28.

The recognition camera 30 detects individual recognition information of a user. The recognition camera 30 images feature information specific to an individual such as the face of the user in order to detect the individual recognition information of the user. In the main controller 200, authentication is performed by analysis of collation with an image database of features of a face or the like which is registered in advance, on the basis of image information of the features of the imaged face or the like. The individual recognition information is used to control the operation of the image processing device 10. As the recognition camera 30, an image sensor (a CCD image sensor or a CMOS image sensor) can be applied. The face recognition adopts a filter configuration (filter configuration in which the contour of a face, eyes, a nose, a mouse, and the like are precisely detected) which is suitable for the face recognition.

The human sensor 28 and the access camera 29 are not necessarily required to be individual members, and may be sensors that perform both human detection and access detection. For example, these sensors, which are constituted by a two-dimensional infrared array sensor, may acquire a two-dimensional infrared image to detect temperature distribution of an area, may detect a human body, and may detect the movement of the human body in real time.

Meanwhile, an object imaged by the recognition camera 30 is not limited to a face, and a bar code or a QR code (registered trademark) given to a product (an ID card or a document) which is carried by a user may be imaged and collated. The human sensor 28 and the access camera 29 can be attached to a longitudinally elongated rectangular pillar portion in the housing of the image processing device 10. The recognition camera 30 can be attached to the vicinity of the UI touch panel. The recognition camera 30 may be configured to be attached to the back wall of the image processing device 10 or a pole and to image the user from the front, or may be configured to be used for the authentication of the user in the vicinity of the image processing device and to be oriented downward to be used together with a scanner that captures and takes in an image. The access camera 29 and the recognition camera 30 may be configured as an integrated camera functioning as both the cameras.

In addition, the recognition camera 30 is not necessarily required to be provided in the image processing device 10, and may be a monitoring camera that monitors surrounding areas of the image processing device 10 or a network camera connected to a network. Alternatively, the recognition camera 30 may be a camera of a portable terminal carried by the user. A configuration may also be adopted in which a facial image obtained by the monitoring camera, the network camera, or the user's portable terminal is received by a network server, the network server performs authentication, and an authentication result is supplied to the image processing device 10. In summary, in the present invention, it is confirmed whether or not a printing job associated with an authenticated user is present, as described later, in accordance with the image processing device acquiring the user's authentication result, and the printing job is performed without receiving a log-in operation from the user in a case where the printing job is present. A configuration may also be adopted in which the authentication result is acquired by authentication determination performed by the device or is acquired from another device.

In addition, the image processing device 10 may also include a speaker that utters a notification sound to the user or a microphone that inputs a sound from the user, or may include an interface for establishing communication with a portable terminal (smart phone or the like) carried by the user.

Figure 3:
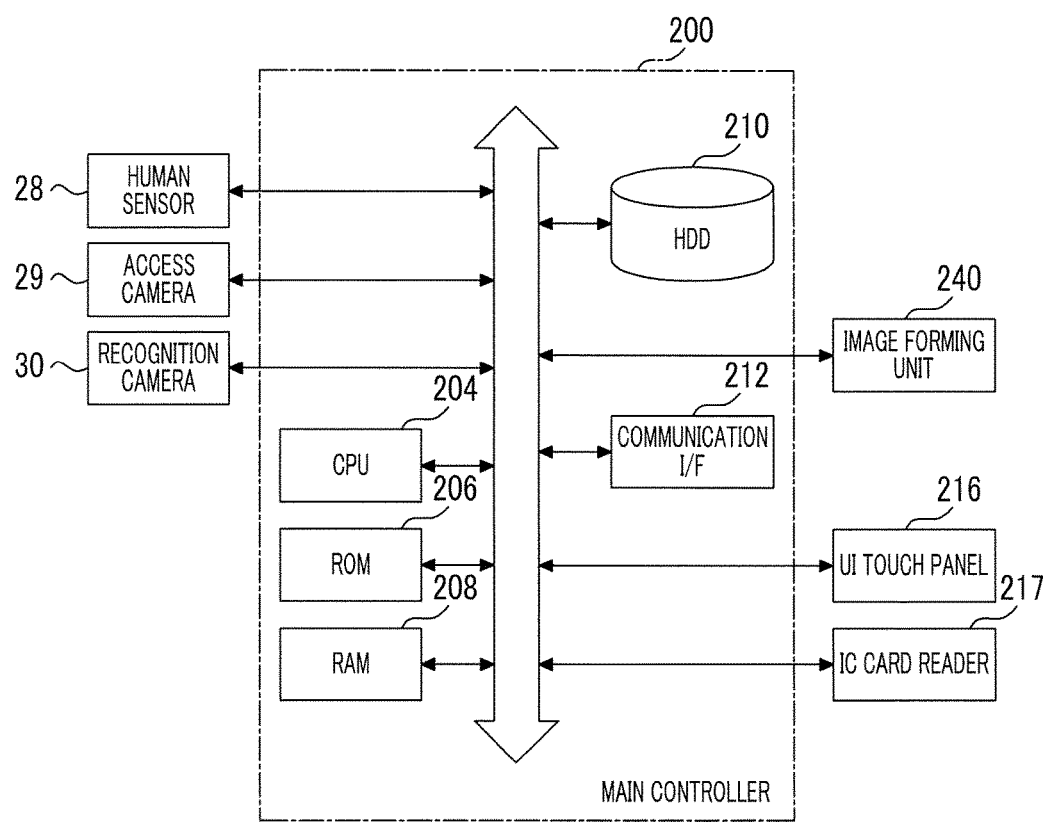
FIG. 3 is a block diagram illustrating a configuration of a main controller of the exemplary embodiment.

FIG. 3 is a block diagram illustrating a configuration of the main controller 200. The main controller 200 includes a CPU 204, a ROM 206, a RAM 208, a hard disk drive (HDD) 210, a communication interface (I/F) 212, and a bus. An image forming unit 240, a UI touch panel 216, and an IC card reader 217 are connected to the bus. The CPU 204 is operated on the basis of a processing program stored in the ROM 206, the hard disk 210, or the like, thereby realizing the function of the main controller 200. Meanwhile, the program from a storage medium (a CD, a DVD, a Blue-ray disk (BD), a USB memory, an SD memory, or the like) which stores the program is installed, and the CPU 204 is operated on the basis of the program, whereby the function may be realized. Meanwhile, the facsimile communication control circuit 236 and the image reading unit 238 are also connected to the bus (see FIG. 2), but a description thereof will be omitted for convenience of description.

When a user outputs a printing instruction including document data to the image processing device 10 from the PC 21 in the user's seat, the main controller 200 receives the printing instruction, temporarily reserves the printing instruction without immediately executing the printing instruction, and stores the printing instruction in the HDD 210 or the RAM 208 in association with the user. Thereafter, when the user approaches the image processing device 10 and performs authentication by using the recognition camera 30, the user's printing instruction reserved is read out and executed by using the completion of the authentication as a trigger. At this time, the main controller 200 performs printing by setting only the completion of authentication as a condition of the start of printing, without needing to operate the UI touch panel 216. Therefore, the user can print a desired document by only outputting the printing instruction from the PC 21 and completing authentication by the image processing device 10, and thus operation by the UI touch panel 216 of the image processing device 10 becomes unnecessary. The user does not need to log in by operating the UI touch panel 216 of the image processing device 10, and log-out processing after the completion of printing also becomes unnecessary as a matter of course.

Figure 4:
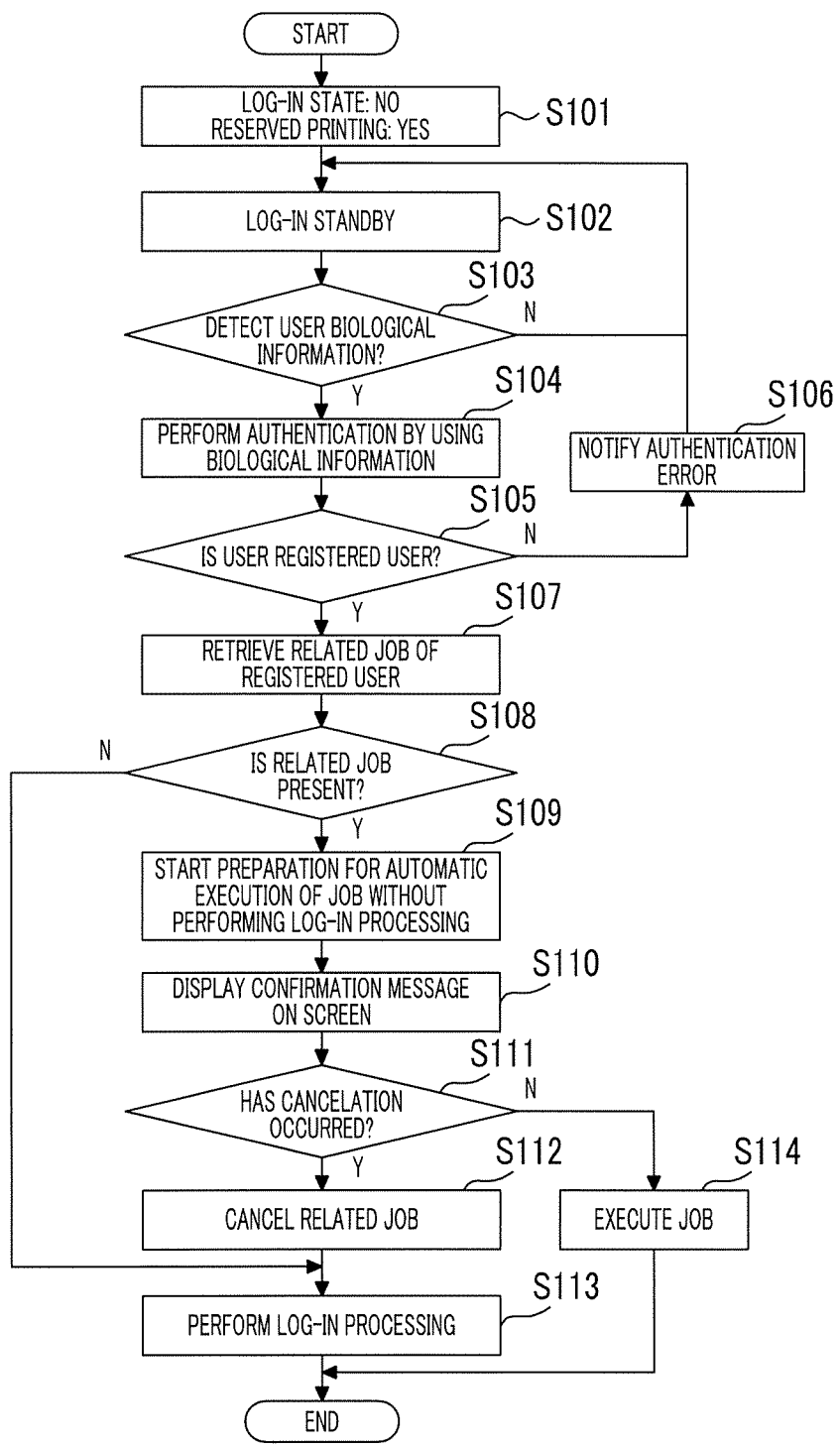
FIG. 4 is a flowchart illustrating a process of a first exemplary embodiment.

FIG. 4 illustrates a flow chart of a process of this exemplary embodiment. A multi-function printer having plural functions such as printing and scanning will be described as an example of the image processing device 10.

First, as the state of the image processing device 10, it is assumed that a user does not log in and a printing instruction (reserved printing) which is reserved in relation to the user is present in the HDD 210 or the RAM 208 (S101). The image processing device 10 transitions to a log-in standby state of the user, and a message or the like indicating the log-in standby state is appropriately displayed on the UI touch panel 216 (S102).

Next, the main controller 200 of the image processing device 10 determines whether or not biological information of the user has been detected (S103). When individual recognition information of the user is detected by the recognition camera 30 (YES in S103), authentication using the obtained biological information is performed (S104). That is, the main controller 200 performs authentication by analysis of collation with an image database of features of a face or the like which is registered in advance, on the basis of features of the imaged face or the like of the user. It is determined whether or not the user is a user who is registered in advance (S105).

In a case where the user is not a user who is registered in advance (NO in S105), an authentication error is notified by being displayed on the UI touch panel 216 (S106), and the state transitions to the log-in standby state again (S102).

In a case where the user is a user who is registered in advance (YES in S105), the main controller 200 retrieves reserved printing related to the user which is stored in the HDD 210 or the RAM 208 (S107), and it is determined whether or not reserved printing (job) related to the user is present (S108).

In a case where the related job is present (YES in S108), the main controller 200 starts preparation for the automatic execution of the related job without performing log-in processing of the user, that is, without requiring an operation such as the input of a password using the UI touch panel 216 from the user (S109). A confirmation message is displayed on the screen of the UI touch panel 216 (S110). The confirmation message is, for example, "related job will be automatically executed" or the like, and a countdown of "3, 2, 1" is also displayed. It may be that a stop button for stopping the automatic execution of the related job is displayed together with the confirmation message.

The main controller 200 displays the confirmation message and determines whether or not cancelation has occurred during the execution of the countdown (S111). In a case where the user operates a cancel button, it is determined that cancelation has occurred (YES in S111), the automatic execution of the related job for which the automatic execution preparation has been started in S109 is cancelled (S112), and log-in processing is performed (S113). Meanwhile, a configuration may also be adopted in which either the execution of log-in after cancelation or the non-login after cancelation can be selected. In the former case, the log-in processing in S113 is performed. In the latter case, the log-in processing is not performed, and thus the processing may proceed to S102.

On the other hand, in a case where the user does not perform cancelation during the execution of the countdown (NO in S111), the main controller 200 performs the automatic execution of the related job for which the preparation has been started, as it is (S114). Thereby, the automatic execution of the job related to the user is performed, and the user can acquire a printed document without logging in to the image processing device 10. The user can bring the document back without requiring labor of logging out. Further, the user has not logged in, and thus a user other than the user can also log in to the image processing device 10.

In this sense, an operation start waiting time of the next user which is caused by the log-in of the previous user is cancelled.

Meanwhile, in a case where the related job of the user is not present (NO in S108), log-in processing is performed without performing the processes of S109 to S112.

FIGS. 5 to 8 illustrate an example of the display of the screen of the UI touch panel 216.

Figure 5:
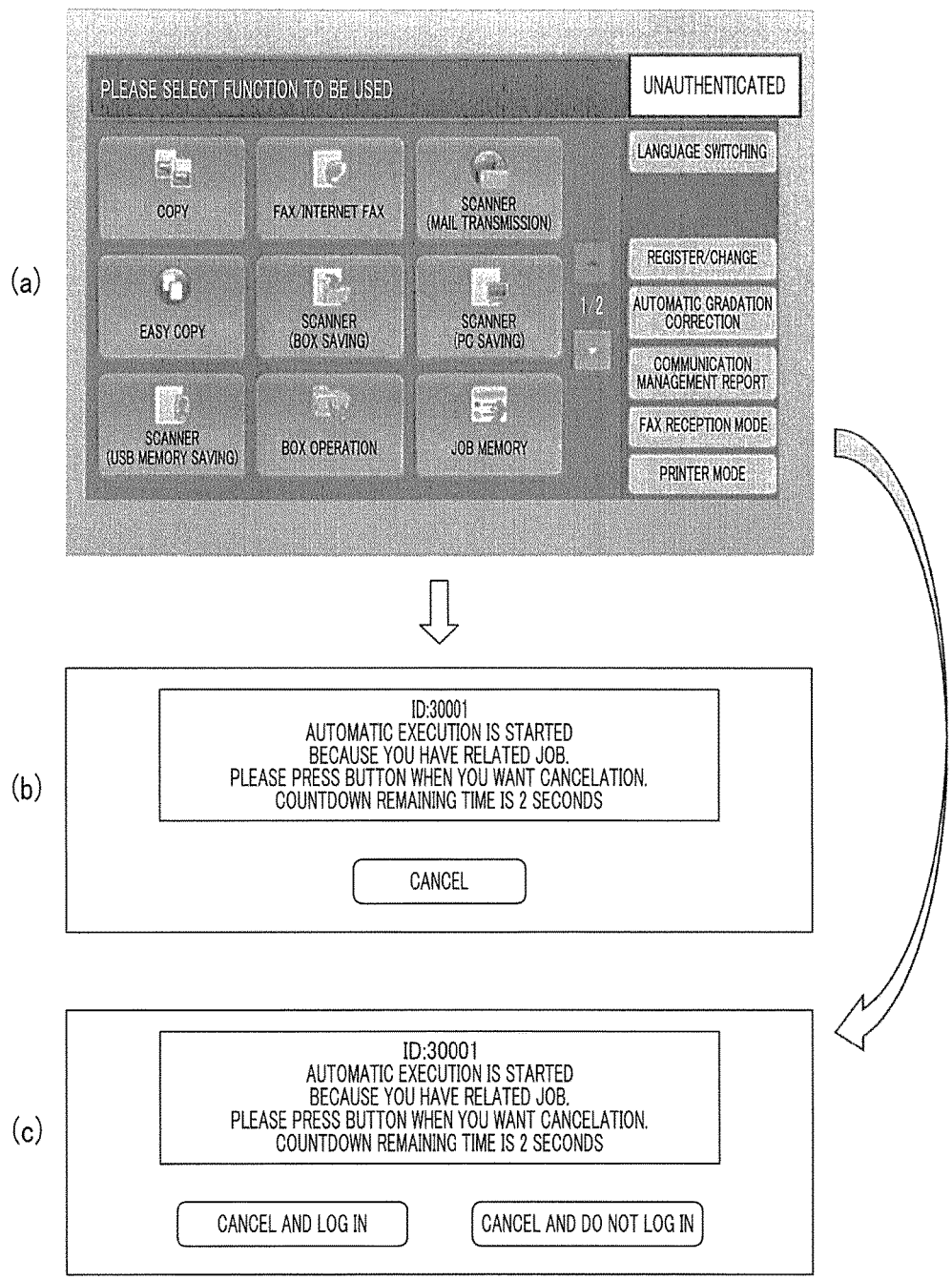
FIG. 5 illustrates an example of a screen (Part 1) of a UI touch panel.

A part (a) in FIG. 5 illustrates an example of a screen corresponding to S101 and S102 of FIG. 4, and the screen is a screen in a log-in standby state. A menu of a multi-function printer as the image processing device 10 is displayed as icons, and a user selects any one of these functions after log-in processing is performed. Since the user has not been yet authenticated, "unauthenticated" indicating that authentication has not been performed is displayed on the screen.

A part (b) in FIG. 5 illustrates an example of a screen corresponding to S110 of FIG. 4, and illustrates processing in a case where a user is authenticated as a registered user by acquiring biological information (facial image and the like) of the user by the recognition camera 30, and a related job of the authenticated user is present. A message "ID: 30001 Automatic execution is started because you have a related job. Please press the button when you want cancelation. Countdown Remaining time is XX seconds" is displayed on the screen, and a countdown is performed. A "cancel" button is displayed below the message. The authenticated user operates the "cancel" button when stopping the automatic execution.

A part (c) in FIG. 5 illustrates another example of the screen corresponding to S110 of FIG. 4. Similarly, the fact that the automatic execution of a related job is performed is displayed, and a countdown is performed. A "cancel and log in" button and a "cancel and do not log in" button are displayed below the message. The processes of S112 and S113 are performed when the "cancel and log in" button is operated, and only the process of S112 is performed when the "cancel and do not log in" button is operated. Meanwhile, for example, the log-in processing is performed by the user operating a log-in button, but the "cancel and log in" button also functions as the log-in button. In the case of FIG. 5(*b*), when the user operates the cancel button, the user, for example, separately operates the log-in button to perform log-in processing.

Figure 6:
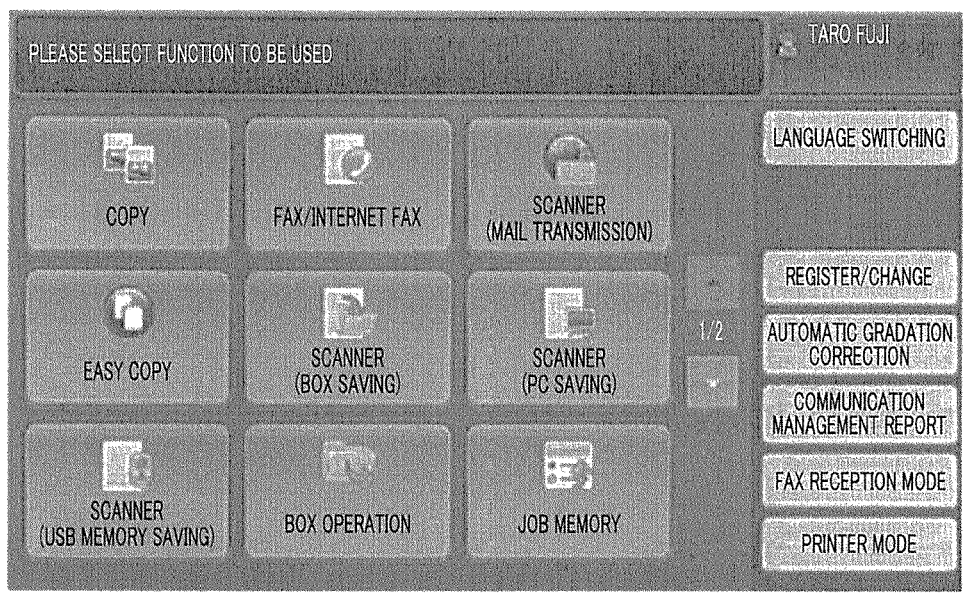
FIG. 6 illustrates an example of a screen (Part 2) of the UI touch panel.

FIG. 6 illustrates an example of a screen in a case where the user operates the "cancel and log in" button in the part (c) in FIG. 5(*c*) and performs log-in processing. The name (in the drawing, "Taro Fuji") of the user having logged in is displayed on the upper right side of the screen in order to indicate a log-in state. The user selects a desired function from a menu and performs the selected function.

Figure 7:
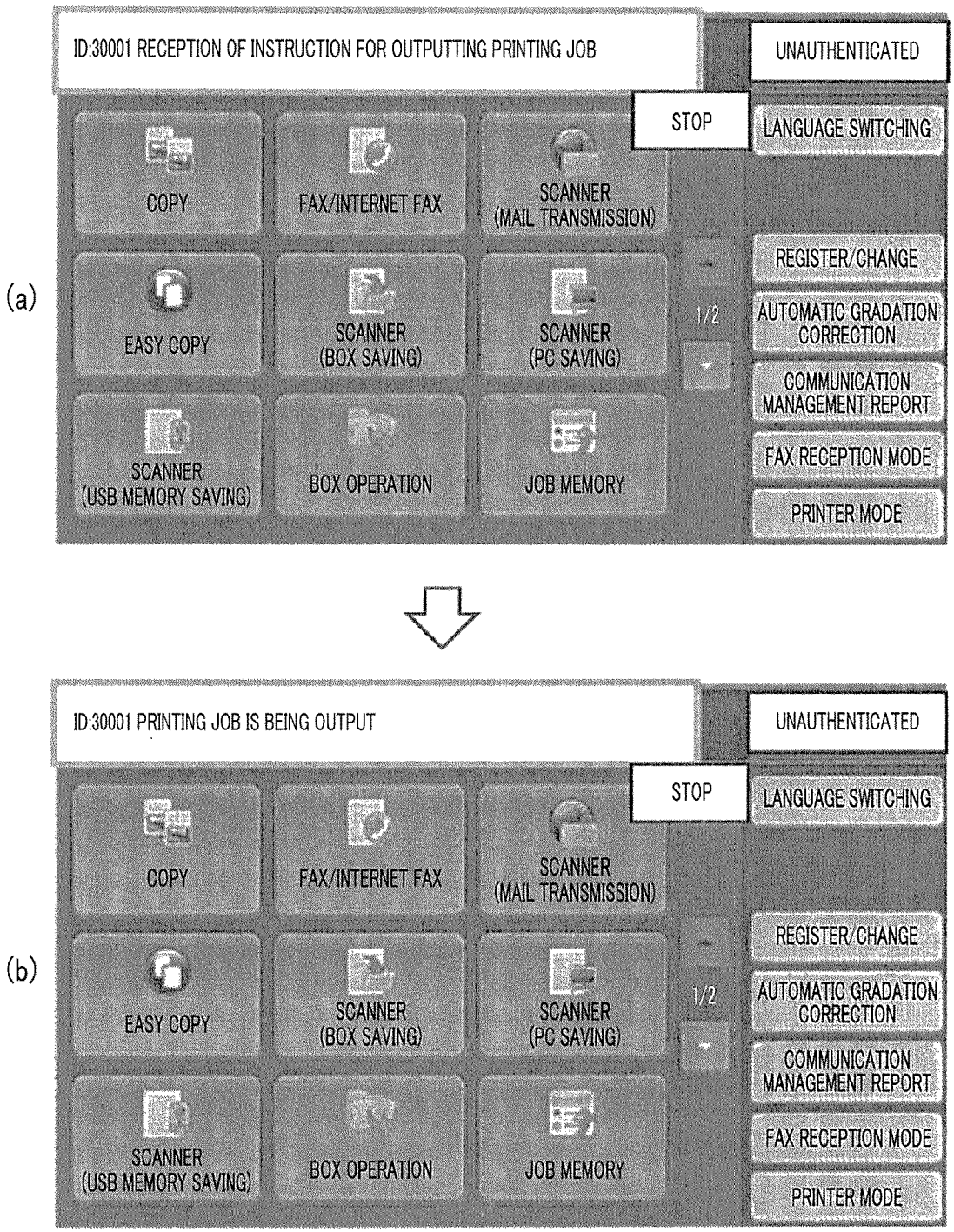
FIG. 7 illustrates an example of a screen (Part 3) of the UI touch panel.

A part (a) in FIG. 7 illustrates an example of a screen in a case where the user does not operate the cancel button during the execution of a countdown and automatic execution is started. A message indicating that the automatic execution of a related job has been started is displayed together with an ID of an authenticated user. For example, "ID:30001 reception of instruction for outputting printing job" is displayed, which indicates that the automatic execution has been started. Meanwhile, "unauthenticated" is displayed on the upper right side of the screen, but it should be noted that this means a non-login state (the user of ID:30001 has been already authenticated by the biological information (facial image and the like) which is obtained by the recognition camera 30). Therefore, "unauthenticated" in this screen means that the authenticated user is present but is in a non-login state. In addition, a "stop" button is also displayed on this screen together with a message, and the authenticated user can stop the automatic execution even after the automatic execution of the related job is started.

A part (b) in FIG. 7 illustrates an example of a screen during the automatic execution of a related job. A message indicating that the automatic execution of the related job is being performed is displayed. For example, "ID:30001 printing job is being output" is displayed. A stop button is also displayed.

In the parts (a) and (b) in FIG. 7, it should be noted that the message regarding the automatic execution of a job related to the authenticated user and the stop button are displayed so as not to interrupt the operation of another user operating the image processing device 10. The automatic execution of a related job of the authenticated user allows another user's log-in and allows another user's operation for the image processing device 10 due to a non-login state. Therefore, in the state of the parts (a) and (b) in FIG. 7, when another user different from the authenticated user performs log-in processing, the user occupies the image processing device 10 (here, a related job of the authenticated user is in an automatic execution state) and can perform a desired job using the image processing device 10.

Figure 8:
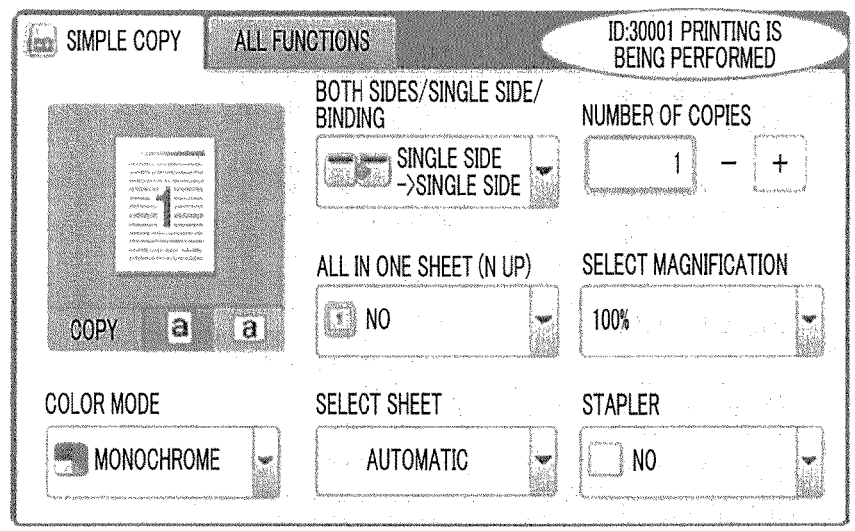
FIG. 8 illustrates an example of a screen (Part 4) of the UI touch panel.
Figure 8:
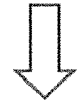
Figure 8:
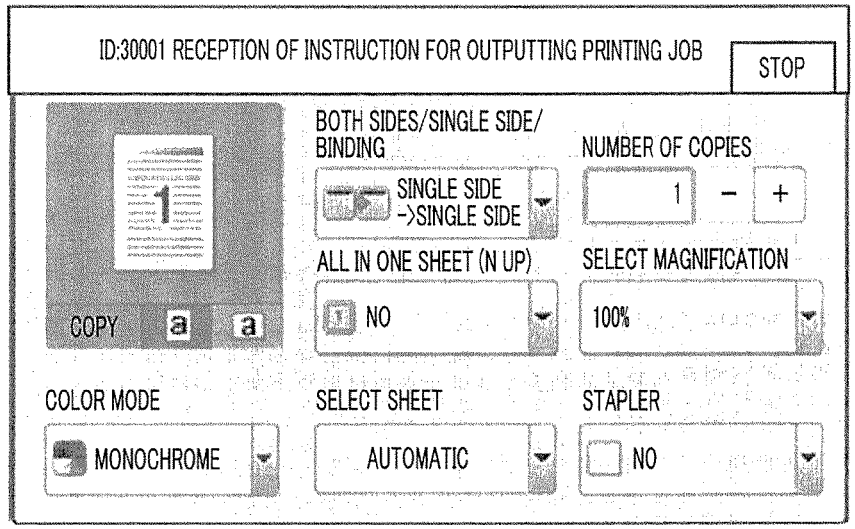

A part (a) in FIG. 8 illustrates another example of a screen during the automatic execution of a job related to an authenticated user. The example is an example in a case where another user different from the authenticated user operates the image processing device 10 (for example, a copying operation). A message indicating that the automatic execution of the related job of the authenticated user is being performed is displayed on the upper right side of the screen. For example, the message is "ID:30001 printing is being performed" or the like. The position and size of this message are determined so as not to interrupt the operation screen. The message may be displayed as a semitransparent message. Another user who is performing operation can understand that the automatic execution of the related job of the authenticated user (user having not yet logged in) is performed by viewing the message.

A part (b) in FIG. 8 illustrates an example of a screen in a case where a message is operated in the screen of the part (a) in FIG. 8. Details of the automatic execution of the related job of the authenticated user are displayed. It is needless to say that the detailed screen is also displayed so as not to interrupt the operation of a user who is performing operation. For example, "ID:30001 reception of instruction for outputting printing job" is displayed on the detailed screen.

Here, regarding a relationship between the authenticated user and the user show is performing operation, the users may be the same person or may be different persons. It is also considered that there is no problem even when the messages of the parts (a) and (b) in FIG. 8 interrupt the operation screen in a case where the users are the same person, but it can be said that it may display the messages so as not to interrupt the operation screen as described above in a case where the users are different persons. Thereby, it can be confirmed whether a document currently printed belongs to a person being in a log-in state or belongs to the authenticated user.

A configuration of this exemplary embodiment will be more specifically described below.

In a case where a related job of a certain user A is reserved in the image processing device 10, the user A moves toward the image processing device 10. When an authentication process of the image processing device 10 is started on the way to the image processing device and the user A is authenticated, the automatic execution of the related job is started, and printed matter is output. The user A acquires the printed matter without performing any operation and leaves the image processing device 10. On the other hand, a user B different from the user A approaches the image processing device 10 in order to operate the image processing device 10, and performs a log-in operation. At this time, the fact that the automatic execution of the related job of the user A is being performed is displayed on the screen of the UI touch panel 216. However, the user A has not logged in, and thus the user B can log in to operate the image processing device 10. The user B performs, for example, a copying operation to acquire the user B's copied document, and leaves the image processing device 10.

In this exemplary embodiment, a user related to the automatic execution of a related job is an authenticated user in spite of not logging in to the image processing device 10. Thus, it is possible not only to effectively reduce the user's labor of logging out while securing security but also to reduce an occupancy state of the image processing device 10 by a specific user.

Second Exemplary Embodiment

In the first exemplary embodiment, in a case where a user is authenticated, the automatic execution of a related job of the authenticated user is performed without a log-in operation of the authenticated user when the related job is present, but switching between the execution and the non-execution of log-in processing of the authenticated user may be performed in accordance with a relative position of the authenticated user to the image processing device 10.

Figure 9:
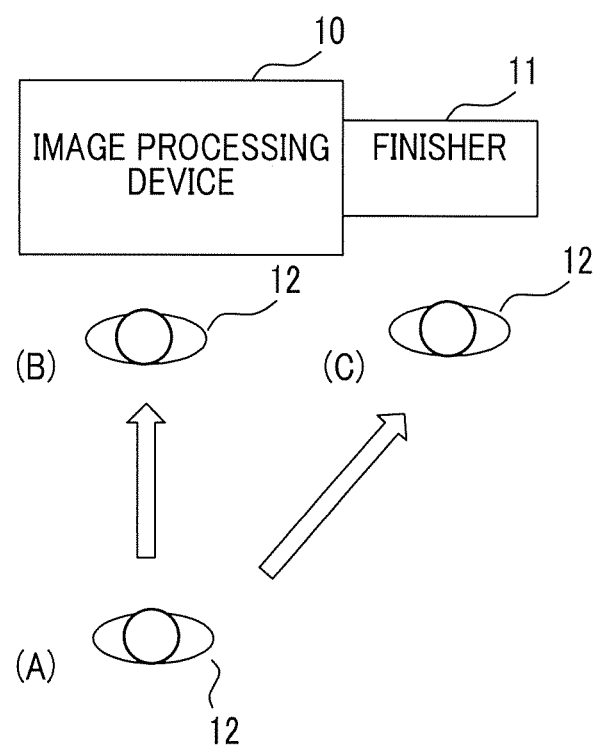
FIG. 9 is a schematic diagram of a second exemplary embodiment.

FIG. 9 is a schematic plan view illustrating changes in a relative position of an authenticated user 12 to an image processing device 10. In a case where the authenticated user 12 moves from a position A spaced apart from the image processing device 10 to a position B in front of the image processing device 10, it can be analyzed that the authenticated user 12 has moved to the front of the image processing device 10 with the intention of logging in. Accordingly, in this case, the log-in processing of the authenticated user 12 is performed. On the other hand, in a case where the authenticated user moves to a position C which is a position in front of a finisher (member that collectively staples pieces of copied or printed matter or the like in units of copies) 11 instead of moving to the front of the image processing device 10 from the position A, it can be analyzed that the authenticated user 12 intends to acquire printed matter as a result of automatic execution. Accordingly, in this case, the log-in processing of the authenticated user 12 is not performed. The position of the authenticated user 12 can be detected by, for example, an access camera 29. A main controller 200 determines whether the position of the authenticated user 12 is the position B or the position C on the basis of a detected signal from the access camera 29, proceeds to log-in processing when the position is the position B, and does not perform log-in processing when the position is the position C. In a case of the position C, the log-in processing of the authenticated user 12 is not performed, and thus it is needless to say that the log-in processing of another user other than the authenticated user 12 is permitted. According to this exemplary embodiment, the switching of log-in processing is automatically performed in accordance with the standing position of the authenticated user 12.

FIG. 10 illustrates a flowchart illustrating a process of the second exemplary embodiment.

First, it is assumed that a user does not log in and a printing instruction (reserved printing) which is reserved in relation to the user is present in an HDD 210 or an RAM 208 as the state of the image processing device 10 (S201). The image processing device 10 transitions to the user's log-in standby state, and appropriately displays a message or the like indicating the log-in standby state on a UI touch panel 216 (S202).

Next, the main controller 200 of the image processing device 10 determines whether or not biological information of the user has been detected (S203). When individual recognition information of the user is detected by a recognition camera 30 (YES in S203), authentication using the obtained biological information is performed (S204). That is, the main controller 200 performs the authentication by analysis of collation with an image database of features of a face or the like which is registered in advance, on the basis of features of the imaged face or the like of the user. It is determined whether or not the user is a user who is registered in advance (S205).

In a case where the user is not a user who is registered in advance (NO in S205), an authentication error is notified by being displayed on the UI touch panel 216 (S206), and the state transitions to the log-in standby state again (S102).

In a case where the user is a user who is registered in advance (YES in S205), the main controller 200 retrieves reserved printing related to the user which is stored in the HDD 210 or the RAM 208 (S207), the main controller 200 determines whether or not reserved printing (job) related to the user which is stored in the HDD 210 or the RAM 208 is present (S208).

In a case where the related job is present (YES in S208), the main controller 200 starts preparation for the automatic execution of the related job without performing log-in processing of the user, that is, without needing to input a password or operate a log-in button by using the UI touch panel 216 from the user (S209). A confirmation message is displayed on the screen of the UI touch panel 216 (S210). The confirmation message is, for example, "related job will be automatically executed" or the like, and a countdown of "3, 2, 1" is also displayed. It may be that a stop button for stopping the automatic execution of the related job is displayed together with the confirmation message.

The main controller 200 displays the confirmation message and determines whether or not cancelation has occurred during the execution of the countdown (S211). In a case where the user operates a cancel button, it is determined that cancelation has occurred (YES in S211), the automatic execution of the related job for which the automatic execution preparation has been started in S209 is cancelled (S212), and log-in processing is performed (S213). Meanwhile, a configuration may also be adopted in which either the execution of log-in after cancelation or the non-login after cancelation can be selected when the user performs cancelation. In the former case, the log-in processing in S213 is performed. In the latter case, the log-in processing is not performed, and thus the processing may proceed to S202.

On the other hand, in a case where the user does not perform cancelation during the execution of the countdown (NO in S211), the main controller 200 performs the automatic execution of the related job for which the preparation has been started, as it is (S214). Then, the position of an authenticated user is detected, and it is determined whether or not the authenticated user is positioned in front of the image processing device 10 (S215). This determination may be performed within a predetermined time after preparation for the automatic execution is started. In a case where the authenticated user is positioned in front of the image processing device 10 (YES in S215), the authenticated user is regarded as having intention of logging in, and thus log-in processing is performed (S213). At this time, the log-in processing may be performed after the automatic execution of the related job is canceled. A message for conforming whether to cancel the automatic execution of the related job may be displayed. In a case where the authenticated user is not positioned in front of the image processing device 10 (NO in S215), specifically, in a case where the authenticated user is positioned in front of a finisher 11, the automatic execution of the related job is continued without performing log-in processing. At this time, the image processing device 10 is not a non-login state, and thus another user can operate the UI touch panel 216 to log in.

In a case where there is no related job of the authenticated user (NO in S208), the log-in processing is performed without performing the processes of S209 to S212. The authenticated user gives an instruction for executing a desired job, for example, copying.

In the exemplary embodiment, as a result of control by the main controller 200, the state of the image processing device 10 include two states that are a log-in state where operation fora specific user is permitted and a non-login state which is a state where a log-in operation of the specific user is received. It can be said that a job reserved in the non-login state is performed without transitioning to the log-in state when the authentication of the specific user in the non-login state has been completed. In addition, it can be said that transition to the log-in state is made in a case of the completion of authentication when a job related to a user is not reserved. Meanwhile, in a case where plural jobs are reserved even when a job related to the user is reserved, transition to the log-in state may be made in a case of the completion of authentication in order to determine which job is preferentially performed. Further, in a case where the authentication has been completed, a user may desire to log in even when a job reserved in the non-login state is performed without transitioning to the log-in state. Therefore, the main controller 200 may be configured to display a button such as "log-in with account of user A" on the UI touch panel 216 while displaying information (for example, an ID or name of an authenticated person) for identifying the user in a case where the authentication of the specific user has been completed, and to simply log in by causing the user only touches the button. The log-in in this case is log-in after the authentication has been already completed, and thus the log-in can be performed by a method simpler than a log-in operation in a case where the authentication has not been completed.

As described above, the exemplary embodiments of the present invention have been described. However, the present invention is not limited to the exemplary embodiments, and various modification examples can be made. Hereinafter, the modification examples will be described.

Modification Example 1

In the exemplary embodiments, a multi-function printer has been described as an example of the image processing device 10. However, the present invention is not limited thereto, and can also be similarly applied to a device which requires authentication and stores processing contents associated with a user given use authority according to the authentication result. In addition, in the exemplary embodiments, as authentication, a process of acquiring information (including biological information) regarding a user and confirming whether or not the information conforms to user information registered in advance is performed. However, a process of acquiring the information regarding the user more simply and giving temporary authority for using an image processing device may be performed instead of performing the process of confirming whether or not the information conforms to the user information registered in advance, and an unspecified large number of users can also be used as objects without limiting the user to a person registered in advance. As an application example in this case, for example, a vending machine selling beverages or the like while displaying various CM images and product images on a display is known. A user communicates with the vending machine by a smart phone or the like, designates an identification number such as an IP address of the vending machine, designates a beverage or the like that the user desires to purchase, and transmits the designated beverage or the like to the vending machine together with an ID or the like of the smart phone. In the vending machine, the purchase of a specific beverage from a specific smart phone is set to be a job, the job is stored in a memory in association with an ID of the specific smart phone, and the job is reserved. In the meantime, various CMs or advertisements of beverages are continuously displayed on the display of the vending machine, and a state where operations of an unspecified large number of users are expected is set. When the user holding the specific smart phone approaches the vending machine, the vending machine detects the approach of the smart phone (and the user) by short-range wireless communication such as Bluetooth (registered trademark), performs the automatic execution of the job reserved in association with the smart phone (user), and automatically takes out a beverage or the like. At this time, an image, reserved in advance, which includes a message indicating that a schedule of the purchase of a beverage or the like has been performed is displayed on the display. This is for the purpose of causing a person passing the vicinity of the vending machine by chance not to misrecognize that the beverage or the like is his or her own beverage or the like. A configuration may also be adopted in which a lock of a discharge port for taking out the beverage or the like is automatically canceled by the ID or the like of the smart phone. It can be said that a reserved image forming instruction is executed also in this modification example in the sense that an image related to the reserved job is displayed at the time of performing the reserved job. That is, the image forming instruction received from the user does not necessarily need to be a direct instruction for image formation, and any instruction may be accompanied by the formation of an image related to the instruction. Meanwhile, a charging process may be performed at a timing when data of a beverage desired to be purchased is received, or may be performed at a timing when a beverage is actually taken out. The user can acquire a desired beverage or the like by only approaching the vending machine without actually operating an operation panel of the vending machine. Further, in this meantime, another user other than the user can also purchase a beverage or the like by operating the vending machine. Products in the vending machine are not limited to beverages, and may be various foodstuffs or various tickets. Further, the image forming device may be an elevator displaying floors in addition to being the vending machine. In the elevator, a floor at which a user is to get off is registered in advance by using a smart phone or the like, and the automatic execution of a reserved job is performed to automatically display the floor at which the user is to get off without operating the floor at which the user is to get off by using the operation panel, in a case where the user actually gets on the elevator.

Modification Example 2

In the exemplary embodiments, as illustrated in the examples of the screens of the parts (b) and (c) in FIG. 5, an authenticated user's intention is confirmed by displaying the "cancel" button. However, in addition to this, the automatic execution of a related job may be canceled in a case where the authenticated user's gaze is detected and it is detected that the authenticated user continuously views a specific portion (portion related to cancelation) of the screen of the UI touch panel 216, or the automatic execution of the related job may be canceled in a case where the authenticated user's input of a sound such as "stop" is detected.

Modification Example 3

In the exemplary embodiments, log-in processing is performed in a case where the authenticated user 12 is positioned in front of the image processing device 10. However, in a case where the authenticated user 12 is positioned in front of the image processing device 10 but log-in processing is not performed because there is no operation from the authenticated user 12 in spite of the elapse of a fixed time, the log-in processing may be stopped to start the automatic execution of a related job again. This is because the authenticated user 12 may wait for the completion of the related job in front of the image processing device 10 instead of the finisher 11.

Modification Example 4

In the exemplary embodiments, the recognition camera 30 recognizes a user in the vicinity of the image processing device 10 at all times, and thus there is a possibility that the authenticated user 12 is authenticated again even during the automatic execution of a related job of the authenticated user 12. In a case where the authenticated user 12 is positioned in the vicinity of the image processing device 10 even after the automatic execution of the related job of the authenticated user 12 is performed and the authenticated user 12 acquires printed matter, there is also a possibility that the user's authentication is started again. Consequently, the main controller 200 may not performs an authentication process (S104, S204) in a case where the authenticated user having performed the automatic execution of the related job is detected by the recognition camera 30 during the automatic execution. In addition, the main controller 200 may display a confirmation message indicating whether to log in after authentication on the screen of the UI touch panel 216, and may confirm the authenticated user's intention.

Modification Example 5

In the second exemplary embodiment, another user's log-in is enabled without performing the log-in processing of the authenticated user 12 in a case where the authenticated user 12 is positioned in front of the finisher 11, and the log-in processing of the authenticated user 12 is performed in a case where the authenticated user 12 is positioned in front of the image processing device 10. However, the present invention is not limited to the finisher 11, and the log-in processing of the authenticated user 12 may be performed in a case where the authenticated user is positioned in front of the UI touch panel 216 without performing the log-in processing in a case where the authenticated user 12 is positioned in front of a portion in which a result matter having been subjected to the related job is output. In short, the main controller 200 may adaptively change whether to perform log-in processing on the authenticated user 12 in accordance with a relative position to the image processing device 10 of the authenticated user 12 after the automatic execution of the related job of the authenticated user 12 is started.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
   a processor, configured to:
   receive an image forming instruction from a user;
   reserve the image forming instruction in association with the user;
   accept a user's log-in operation; and
   authenticate the user; and
   an image forming unit comprising a microcontroller that executes the image forming instruction that is reserved and associated with the authenticated user, without accepting the log-in operation in a case when the authentication has been completed and the image forming instruction related to the authenticated user is reserved, wherein an execution of the image forming instruction is automatically triggered by a completion of the authentication,
   wherein the processor makes a transition to a log-in state where use for a specific user is permitted in a case where the image forming instruction is not reserved by the processor and the authentication by the processor has been completed in the non-login state,
   wherein the processor accepts a log-in operation from another user when the image forming instruction associated with the authenticated user is being executed in a case where the image forming unit executes the image forming instruction that is reserved and associated with the authenticated user without accepting the log-in operation from the user.

2. The image processing device according to claim 1, further comprising:
   a display that displays a message indicating that the image forming instruction is being executed, in a case where the image forming unit executes the image forming instruction associated with the authenticated user.

3. The image processing device according to claim 1, further comprising:
   a display that displays a message indicating that the image forming instruction is being executed, in a case where the image forming unit executes the image forming instruction associated with the authenticated user.

4. The image processing device according to claim 2, wherein the display displays a stop button for stopping the execution of the image forming instruction, together with the message.

5. The image processing device according to claim 3, wherein the display displays a stop button for stopping the execution of the image forming instruction, together with the message.

6. The image processing device according to claim 1, wherein the processor does not authenticate the authenticated user again in a case where the image forming unit executes the image forming instruction associated with the authenticated user.

7. The image processing device according to claim 1, wherein the processor does not authenticate the authenticated user again in a case where the image forming unit executes the image forming instruction associated with the authenticated user.

8. The image processing device according to claim 2, wherein the processor does not authenticate the authenticated user again in a case where the image forming unit executes the image forming instruction associated with the authenticated user.

9. The image processing device according to claim 3, wherein the processor does not authenticate the authenticated user again in a case where the image forming unit executes the image forming instruction associated with the authenticated user.

10. The image processing device according to claim 4, wherein the processor does not authenticate the authenticated user again in a case where the image forming unit executes the image forming instruction associated with the authenticated user.

11. The image processing device according to claim 5, wherein the processor does not authenticate the authenticated user again in a case where the image forming unit executes the image forming instruction associated with the authenticated user.

12. The image processing device according to claim 1, wherein the image forming unit changes the acceptance of the log-in operation of the authenticated user by the processor in accordance with a position of the authenticated user after the execution of the image forming instruction associated with the authenticated user is started.

13. The image processing device according to claim 1, wherein the image forming unit changes the acceptance of the log-in operation of the authenticated user by the processor in accordance with a position of the authenticated user after the execution of the image forming instruction associated with the authenticated user is started.

14. The image processing device according to claim 2, wherein the image forming unit changes the acceptance of the log-in operation of the authenticated user by the processor in accordance with a position of the authenticated user after the execution of the image forming instruction associated with the authenticated user is started.

15. The image processing device according to claim 1, wherein the image processing device has two states that are the log-in state and a non-login state which is a state where a log-in operation of the specific user is accepted, and
wherein the image forming unit performs image formation without making transition to the log-in state in a case where the authentication by the processor has been completed in the non-login state.

16. The image processing device according to claim 15, wherein the transition to the log-in state is made in a case where a plurality of the image forming instructions are reserved by the processor and the authentication by the processor has been completed in the non-login state.

17. The image processing device according to claim 5, wherein the processor accepts the log-in operation by using a relatively simple method in a case where the authentication by the processor has been completed, compared to a case where the authentication has not been completed.

18. A non-transitory computer readable medium storing a program causing a computer to execute:

receiving an image forming instruction from a user;

reserving the image forming instruction in association with the user;

accepting a user's log-in operation;

authenticating the user;

executing the image forming instruction that is reserved and associated with the authenticated user, without accepting the log-in operation in a case when the authentication has been completed and the image forming instruction related to the authenticated user is reserved, wherein an execution of the image forming instruction is automatically triggered by a completion of the authentication;

making a transition to a log-in state where use for a specific user is permitted in a case where the image forming instruction is not reserved and the authentication by the processor has been completed in the non-login state; and accepting a log-in operation from another user when the image forming instruction associated with the authenticated user is being executed in a case where the image forming unit executes the image forming instruction that is reserved and associated with the authenticated user without accepting the log-in operation from the user.

* * * * *